A. P. BRUSH.
DIFFERENTIAL MECHANISM.
APPLICATION FILED AUG. 6, 1917.

1,314,568.

Patented Sept. 2, 1919.

Inventor
Alanson P. Brush
By Thurston & Rivos
attys.

UNITED STATES PATENT OFFICE.

ALANSON P. BRUSH, OF DETROIT, MICHIGAN.

DIFFERENTIAL MECHANISM.

1,314,568.  Specification of Letters Patent.  Patented Sept. 2, 1919.

Application filed August 6, 1917. Serial No. 184,577.

*To all whom it may concern:*

Be it known that I, ALANSON P. BRUSH, a citizen of the United States, residing at Detroit, in the county of Wayne and State of Michigan, have invented a certain new and useful Improvement in Differential Mechanism, of which the following is a full, clear, and exact description.

The object of this invention is to produce, in a cheap form, a suitably inefficient differential mechanism adapted for use on automobiles.

It is desirable in automobiles that the differential mechanism, by which automatically differentiated motion may be transmitted to the driving wheels, shall not be so efficient that in the event that one driving wheel is in contact with a slippery road surface, the other driving wheel may remain immovable. In fact, it is desirable that under no possible condition of use shall it be possible for one driving wheel to remain completely immovable while the other rotates. To attain this desired inefficiency of the differential action a variety of expensive and in some cases complicated mechanisms have been produced and are in successful use. The present invention, however, attains the same desired results, and its advantage grows out of its simplicity and cheapness.

Figure 1:
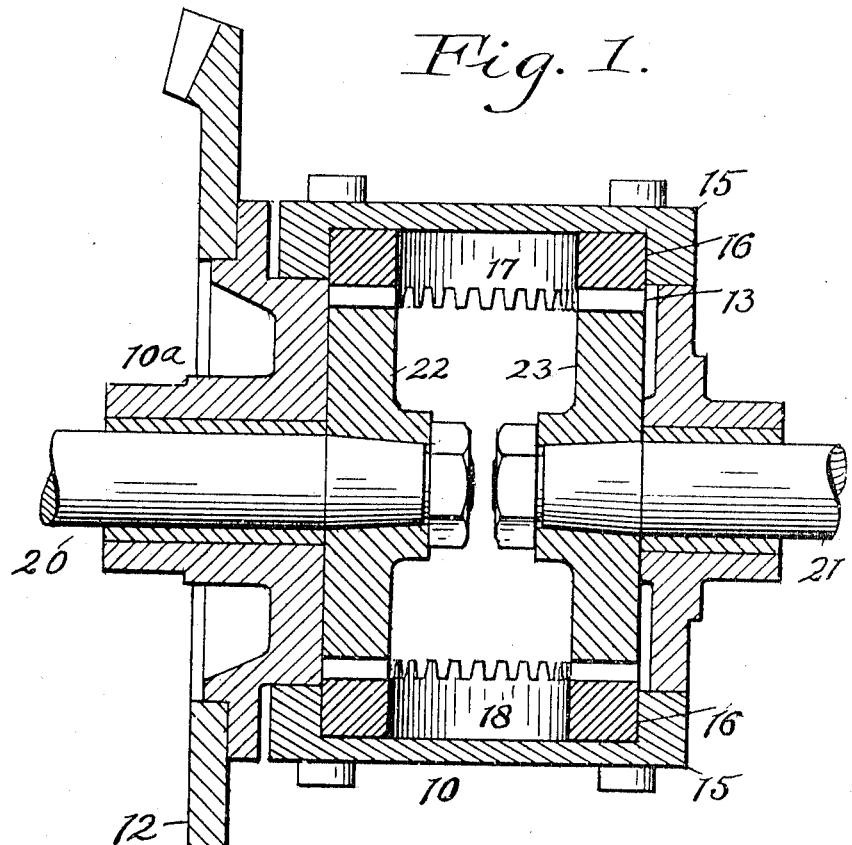
Figure 2:
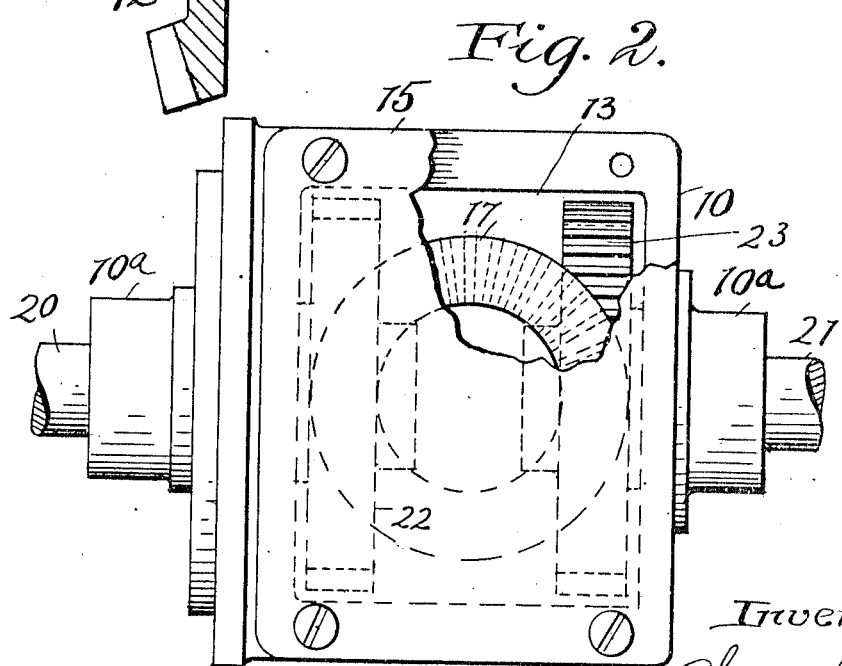

In the drawing, Figure 1 is a central longitudinal sectional view through differential mechanism embodying the present invention; and Fig. 2 is a plan view of the said differential mechanism when the ring gear is omitted therefrom.

Referring to the parts by reference characters, 10 represents the rotatable differential drum, as it is generally called. The ring gear 12 is fixed to this drum whereby the latter may be rotated. 20 and 21 represent the two axle shafts. Those familiar with this art will understand that the driving wheels may be fixed respectively to these two axle shafts; or, suitable means may be employed by which rotary motion will be transmitted from these two axle shafts to the driving wheels respectively.

These two axle shafts project through and are rotatably mounted in hubs 10ª formed in the ends of the differential drum. It will be understood, however, that so far as this present invention is concerned it does not matter whether the differential drum is rotatably supported by the axle housing or some other fixed frame member, in which event the inner ends of the axle shafts will be supported by the differential drum; or whether, on the other hand, the axle shafts are mounted in fixed bearings, and the differential drum is supported on said axle shafts,—both constructions being recognized equivalents in this art.

Two spur gears 22 and 23 are respectively fixed to the inner ends of these two axle shafts within the differential drum.

The compensating gears 17 and 18 are flat annular crown wheels of the type which will mesh correctly with spur gears whose axes are at right angles to the axes of the crown wheels. Such crown wheels may be formed by the Fellows gear shaper generating process, and are familiar to mechanics generally. These annular flat crown wheels are rotatably mounted in shallow cylindrical bearing cups in the differential drum with their axes at right angles to the axis of the spur gears. These bearing cups as shown are shallow cylindrical recesses 16 formed in the inner faces of plates 15,—which plates are removably fixed to the differential drum, covering holes 13 through its wall.

The cylindrical outer peripheries of these crown wheels have bearings in the cylindrical outer walls of these cups; and the plain back faces of the crown wheels bear against the bottom or back surfaces of said cups. When the differential drum is rotated, rotary motion is transmitted through these crown wheels to the spur gears, with which they are always in mesh. Under normal conditions the crown wheels will not rotate, and therefore both axle shafts will be rotated in unison in the same direction, but under certain circumstances, as for example, when the automobile is turning the corner, these crown wheels will automatically rotate enough to permit the required difference in the rate of rotation of the two axle shafts to prevent either wheel from dragging on the road surface. But as power is transmitted through these crown wheels to the spur gears the pressure between the intermeshing gear teeth tends to force the crown wheels sidewise against the annular bearing surfaces of the cups, and likewise force the crown wheels back against the bottoms of said cups. This produces such an amount of friction as greatly impairs the efficiency of the mechanism for differentiating the rotation of the two axle shafts.

In fact, this inefficiency is so great that it is practically impossible that either shaft shall, under any practical conditions, not rotate. Therefore, if one of the road wheels is engaging with a slippery road surface upon which it has no traction, the other wheel will certainly rotate some and therefore cause the vehicle to travel forward.

Having thus described my invention, what I claim is:

1. In a differential mechanism, the combination of a rotatable differential drum, independently rotatable axle shafts which are concentric with the differential drum and project into the same from opposite ends thereof, spur gears fixed to said axle shafts within said differential drum, and a crown wheel rotatably mounted on the differential drum in mesh with both gears, and with its axis at right angles to the axis of said spur gears, which crown wheel is mounted so as to be movable in the direction of its axis, and said crown wheel and drum being provided with friction surfaces which will be forced into contact by the movement of the crown wheel away from the axis of the drum.

2. In differential mechanism, the combination of a rotatable differential drum, independently rotatable axle shafts which are concentric with the differential drum and project into the same from opposite ends thereof, spur gears fixed to said axle shafts within said differential drum, a crown wheel in mesh with both spur gears,—said differential drum having a shallow cylindrical cup in which the crown gear is rotatably mounted with its back face in contact with the bottom of said cup.

3. In differential mechanism, the combination of a rotatable differential drum having a hole therein, independently rotatable axle shafts which are concentric with the differential drum and project into the same from opposite ends thereof, a plate removably secured to said drum over said hole therein which plate is provided with a cylindrical bearing cup on its inner face, a crown wheel rotatably mounted in said pocket, in mesh with both spur gears.

In testimony whereof, I hereunto affix my signature.

ALANSON P. BRUSH.